US 12,166,351 B2

(12) United States Patent
Fifield

(10) Patent No.: US 12,166,351 B2
(45) Date of Patent: Dec. 10, 2024

(54) METHOD FOR MANAGING FLOW EQUALIZATION AMONG CONSUMERS ON A COMMON DISTRIBUTION NETWORK

(71) Applicant: Astronics Advanced Electronic Systems Corp., Kirkland, WA (US)

(72) Inventor: Jon M. Fifield, Kent, WA (US)

(73) Assignee: Astronics Advanced Electronic Systems Corp., Kirkland, WA (US)

( * ) Notice: Subject to any disclaimer, the term of this patent is extended or adjusted under 35 U.S.C. 154(b) by 356 days.

(21) Appl. No.: 17/527,760

(22) Filed: Nov. 16, 2021

(65) Prior Publication Data

US 2022/0078126 A1    Mar. 10, 2022

Related U.S. Application Data

(63) Continuation-in-part of application No. PCT/US2020/033307, filed on May 16, 2020.
(Continued)

(51) Int. Cl.
*G05D 7/06* (2006.01)
*H02J 3/14* (2006.01)
(Continued)

(52) U.S. Cl.
CPC .............. *H02J 3/14* (2013.01); *G05D 7/0623* (2013.01); *H04L 47/10* (2013.01); *H04L 47/127* (2013.01);
(Continued)

(58) Field of Classification Search
CPC ...... H02J 3/14; H02J 2310/00; H02J 2310/44; G05D 7/0623; H04L 47/10; H04L 47/127;
(Continued)

(56) References Cited

U.S. PATENT DOCUMENTS 3,823,327 A * 7/1974 Bayer ................. H02J 3/06
307/58
6,233,611 B1    5/2001 Ludtke et al.
(Continued)

FOREIGN PATENT DOCUMENTS

EP         1057155 B1 *  1/2004  ............. G08G 1/01
JP         2013-9974      5/2013
JP       2014509177 A *  4/2014

OTHER PUBLICATIONS

Kingsford, "CMSC 451: Network Flows", Aug. 2017, p. 33 downloaded from the internet https://web.archive.org/web/20170829025223/https://www.cs.smu.edu/~ckingsf/bioinfo-lectures/netflow.pdf (Year: 2017).

(Continued)

*Primary Examiner* — Khaled M Kassim
*Assistant Examiner* — Oladiran Gideon Olaleye
(74) *Attorney, Agent, or Firm* — Wiggin and Dana LLP

(57) ABSTRACT

Disclosed are methods and systems to manage and limit, by the development of a flow equalization equation, the amount of total input flow capacity within a network among three or more identical consuming members connected on a common distribution network. An objective of this method, and systems implementing the method, is to minimize the maximum input flow volume, such that, any number of consumers devices may operate at full consumption while other consumers are operating at less than full consumption.

15 Claims, 4 Drawing Sheets

Related U.S. Application Data

(60) Provisional application No. 62/848,642, filed on May 16, 2019.

(51) Int. Cl.
*H04L 47/10* (2022.01)
*H04L 47/127* (2022.01)
*H04L 47/2475* (2022.01)
*H04L 47/2483* (2022.01)

(52) U.S. Cl.
CPC ...... *H04L 47/2475* (2013.01); *H04L 47/2483* (2013.01); *H04L 47/29* (2013.01); *H02J 2310/00* (2020.01); *H02J 2310/44* (2020.01)

(58) Field of Classification Search
CPC . H04L 47/2475; H04L 47/2483; H04L 47/29; G06Q 10/06; G06Q 50/06; G06Q 10/00; Y02B 70/3225; Y04S 20/222
USPC ........................................................ 370/230
See application file for complete search history.

(56) References Cited

U.S. PATENT DOCUMENTS

| | | | |
|---|---|---|---|
| 6,377,544 B1 | 4/2002 | Muthukrishnan | |
| 9,712,443 B1 | 7/2017 | Phaal | |
| 10,050,799 B2 | 8/2018 | Kawaguchi | |
| 10,097,258 B1 | 10/2018 | Wakayama | |
| 10,600,134 B2 | 3/2020 | Miyamoto | |
| 2003/0151309 A1 | 8/2003 | Hutton | |
| 2005/0121978 A1 | 6/2005 | McAvoy | |
| 2007/0297332 A1 | 12/2007 | Broberg | |
| 2008/0140347 A1 | 6/2008 | Ramsey et al. | |
| 2008/0157938 A1 | 7/2008 | Sutardja | |
| 2010/0262309 A1 | 10/2010 | Currie | |
| 2010/0306353 A1* | 12/2010 | Briscoe | H04L 41/5022 709/221 |
| 2010/0332373 A1* | 12/2010 | Crabtree | G06Q 40/04 709/224 |
| 2012/0078430 A1 | 3/2012 | Fan | |
| 2012/0224483 A1* | 9/2012 | Babiarz | H04L 43/0894 370/232 |
| 2013/0286846 A1 | 10/2013 | Atlas | |
| 2013/0346572 A1 | 12/2013 | Jain | |
| 2015/0094968 A1* | 4/2015 | Jia | G05B 15/02 702/60 |
| 2015/0123464 A1 | 5/2015 | Hess | |
| 2015/0134126 A1 | 5/2015 | Augusto | |
| 2016/0198325 A1 | 7/2016 | Harishankar et al. | |
| 2017/0180567 A1* | 6/2017 | Sharma | H04M 15/00 |
| 2017/0278199 A1 | 9/2017 | Wu | |
| 2017/0310550 A1 | 10/2017 | Mandle | |
| 2018/0216849 A1 | 8/2018 | Deivasigamani | |
| 2020/0169472 A1 | 5/2020 | Karve | |

OTHER PUBLICATIONS

Wikipedia, "Flow network", 2020 p. 6, downloaded from the internet https://en.wikipedia.org/wiki/Flow_network (Year: 2020).

Carnegie Mellon College, "Lecture #10: Network Flows I", 2015, p. 6, downloaded from the internet http://www.cs.cmu.edu/~avrim/451/lectures/lect1005.pdf (Year: 2015).

Li et al., "Optimal Resource Allocation with Node and Link Capacity Constraints in Complex Networks", 2017, p. 4 downloaded from the internet https://arxiv.org/pdf/1702.06669.pdf (Year: 2017).

WIPO; PCT/US2020/033307; International Search Report; Aug. 6, 2020, p. 15.

* cited by examiner

METHOD FOR MANAGING FLOW EQUALIZATION AMONG CONSUMERS ON A COMMON DISTRIBUTION NETWORK

CROSS REFERENCE TO RELATED PATENT APPLICATION

This application is a continuation-in-part of International Patent Application No. PCT/US2020/033307 filed May 16, 2020, which claims the benefit under 35 U.S.C. § 119(e) of U.S. Provisional Application No. 62/848,642 filed May 16, 2019, all of which are herein incorporated by reference in their entirety. Related U.S. application Ser. No. 16/875,997, filed May 16, 2020 is also herein incorporated by reference in its entirety.

FIELD OF THE DISCLOSURE

The subject matter of the present disclosure generally relates to a method to manage a prescribed quantity of flow volume among three or more consumer members having the same maximum consumption volume limit, or total consumption value (referred to herein as "identical consumer members") connected on a common distribution network.

In one embodiment, the method is applied to In-Flight Entertainment (IFE) power distribution or USB loads in an aerospace application.

BACKGROUND OF THE DISCLOSURE

Methods and techniques for flow equalization management within a distribution network, such as with electric systems, communications or fluid flow systems, are commonly applied within industry. Current methods for flow equalization or optimization are dependent on a communication network between consumer devices and/or an external flow reduction command from a master management controller to facilitate the management of flow volume within the distribution network. The addition of communication networks and/or master controller(s) involves an increase in weight, hardware and software complexity to the over-all system. Furthermore, such methods which rely upon communication between consumers or a master controller are prone to failure and may be inoperable if there is a communication interruption, such as a failed communication line or connection. Thus, there exists great need for a method eliminating all interconnections between consumers other than the media being distributed in a common distribution network.

This disclosure presents a method to manage a prescribed quantity of flow volume using an existing measurement of flow within the network; thereby removing any added communication between consumer members or a flow reduction command from a master management controller, in order to achieve flow equalization among three or more identical consumer members in the network. This method also allows for a least one consumer to achieve 100% flow volume while regulating all other consumers in the common distribution network whereby restricting the maximum input flow into the system to a set prescribed value.

SUMMARY

In an embodiment, the disclosure is directed to a method to manage flow capacity, not to exceed a maximum input flow volume, in a common distribution network, comprising: providing a system in communication with the common distribution network, the system comprising a plurality of consumers within the distribution network, each individual consumer comprising an input flow detector, a central processing unit, a data storage unit, and a flow regulator, wherein each individual consumer includes a total consumption value of 100%; calculating a set of management boundary limits (MBLs) based on a set of flow factors, wherein the MBLs are not-to-exceed values of flow capacity for each of the consumers and wherein the flow factors are predetermined percentages of the total consumption value; loading the MBLs and associated flow factors into the data storage units of each individual consumer; measuring an input flow volume to each individual consumer through the input flow detector to determine a consumer flow value (CFV) for each individual consumer, wherein the CFV is a ratio of the total consumption value to the input flow volume to that corresponding individual consumer; comparing the CFV to the MBL in the central processing unit of each individual consumer such that the central processing unit selects a single flow factor from the set of flow factors; and communicating the single flow factor selected by the central processing unit to the flow regulator to regulate the consumption of flow capacity by each individual consumer.

In a further embodiment, the central processing unit of each consumer compares the CFV to the MBL to i) identify the smallest MBL value not exceeded by the CFV or ii) identify that the CFV exceeds all MBLs; and communicating either of i) the flow factor corresponding to the smallest MBL not exceeded by the CFV, or ii) the flow factor corresponding to the largest MBL if the CFV exceeds all MBLs, from the central processing unit of each of the plurality of consumers to the flow regulator of that corresponding consumer.

In further embodiments, the sets of MBLs and flow factors are identical for each of the consumers.

In further embodiments, the plurality of consumers are aligned on the common distribution network in series.

In further embodiments, the plurality of consumers are aligned on the common distribution network in parallel.

In further embodiments, the CFV is determined at a frequency according to a sampling duty cycle of the input flow detector.

In further embodiments, the media is selected from the group consisting of fluids, electricity, and data.

In further embodiments, each of the MBLs and corresponding flow factors are distributed in the range from about 0.05 to 1.

In further embodiments, the consumers are not linked in communication and wherein the flow capacity of the common distribution network is managed without an external command.

In an embodiment, the disclosure is directed to a method to manage flow capacity, not to exceed a maximum input flow volume, in a common distribution network, comprising: providing a system in communication with the common distribution network, the system comprising a plurality of consumers within the distribution network, each individual consumer comprising an input flow detector, a central processing unit, a data storage unit, and a flow regulator, wherein the system does not include a master control unit for controlling each individual consumer, and wherein each individual consumer includes a total consumption value of 100%; loading a set of management boundary limits (MBLs) calculated based upon a set of flow factors in the data storage units of each individual consumer, wherein the MBLs are not-to-exceed values for each of the consumers and wherein the flow factors are predetermined percentages of the total consumption value; preventing each individual consumer from overdrawing flow capacity from the common distribution network.

In a further embodiment, the sets of MBLs and flow factors are identical for each of the consumers.

In a further embodiment, the plurality of consumers are aligned on the common distribution network in series.

In a further embodiment, the plurality of consumers are aligned on the common distribution network in parallel.

In a further embodiment, the media is selected from the group consisting of fluids, electricity, and data.

In a further embodiment, each consumer comprises an input from the distribution network and an output.

In a further embodiment, the consumers are not linked in communication and wherein the flow capacity of the common distribution network is managed without an external command.

In an embodiment, the disclosure is directed to a system for managing flow capacity of media in a common distribution network, comprising: (a) a plurality of individual consumers within the distribution network, each individual consumer comprising: (i) a data storage unit containing a set of flow factors and a set of management boundary limits (MBLs) calculated from the set of flow factors, wherein the MBLs are not-to-exceed values for each of the consumers, wherein the flow factors are predetermined percentages of the total consumption value of 100%; (ii) an input flow detector for measuring an input flow volume of each individual consumer and any downstream consumers to determine a consumer flow value (CFV), wherein the CFV is a ratio of a total consumption value to the input flow volume of that corresponding individual consumer; and (iii) a central processing unit programmed to compare the CFV to one or more of the MBLs to determine a flow volume limit for the consumer, (b) a flow regulator associated with each individual consumer for regulating consumption of each individual consumer, wherein the flow regulator is internal or external to each individual consumer; and (c) an input flow source of the media.

In a further embodiment, the flow regulator is internal to the consumer.

In a further embodiment, the flow regulator is external to the consumer.

In a further embodiment, the consumers are not linked in communication and the distribution network is the only link between the consumers.

In a further embodiment, the input flow detector signal is not communicated outside of the consumer and wherein the system does not include a master controller.

In a further embodiment, the central processing unit and flow regulator of each consumer communicate over a communication protocol selected from the group consisting of CAN, LIN, and RS485 or any other known appropriate or equivalent protocol.

In an embodiment, the disclosure relates to a method to manage a total input flow capacity of a media to a plurality of consumers interconnected by a common distribution network, comprising the steps of: establishing a consumer flow value, setting a plurality of management boundaries values based on a total number of consumers to establish a plurality of unique flow factors; and communicating a flow factor to a flow regulator to thereby regulate the total output of the media.

In a further embodiment, the plurality of consumers are aligned on the common distribution network in series.

In a further embodiment, the consumer flow value is set to be a ratio of an input flow volume and a total consumption value.

In a further embodiment, the management boundaries are set to be a percentage of total output.

In a further embodiment, each consumer has a same maximum consumption level.

In a further embodiment, the media is selected from the group consisting of fluids, electricity and data.

In a further embodiment, the steps of establishing a consumer flow value, setting a plurality of management boundaries values based on a total number of consumers to establish a plurality of unique flow factors; and communicating a flow factor to a flow regulator to thereby regulate the total output of the media; are each performed by the individual consumers without communication between consumers and without a master controller.

DETAILED DESCRIPTION

Figure 1:
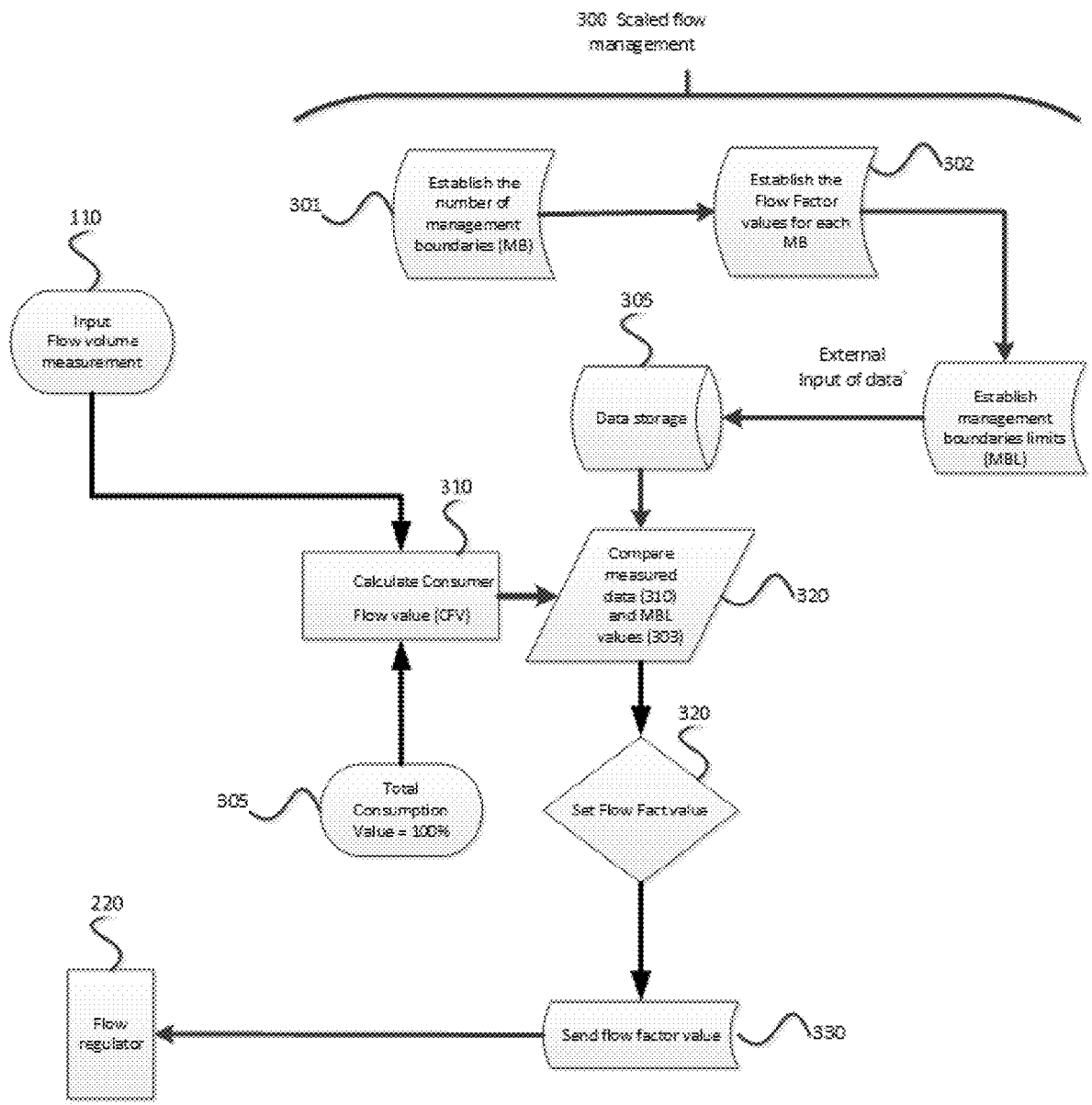
FIG. 1 depicts the Scaled Flow management method data flow diagram.

The subject matter of the present disclosure generally relates to a method to manage a flow volume using a scaled flow management method which regulates the flow volume for each consumer member, not to exceed a defined maximum input flow volume into a distribution network.

An objective of this method is to minimize the maximum input flow volume, such that any number of consumer members may operate at full consumption levels while other consumers are operating at less than full consumption, based on predetermined flow management boundary limit settings. This enables a flow optimization between all consumers throughout the entire distribution network.

The scaled flow management method includes a set of equations to manage the flow optimization effectively and efficiently among identical consumer members within the distribution network.

The flow optimization equation or flow equation is the governing mathematical equation that states the relationship that the sum of all the consumers' consumption, within a common distribution network, is equal to the total amount of input capacity into the network.

Flow Equation

The general form for the flow equation, well known in the studies of flow equalization, relates to a sum of the flow volumes for each consumer (Bx) being equal to the total maximum flow volume (A1) into the distribution network:

$$A_1 = \sum_{i=1}^{n} B_i$$

For the purpose of describing the Scaled Flow management method, an alternative form of the flow equalization equation is:

$$A_1 = \sum_{i=1}^{n-1} B_i + C_n \qquad \text{Eq. 1}$$

where C represents the last consumer on the common distribution network, which allocate a volume flow up to 100% without any intervention from the Scaled Flow management method.

Along with the flow equation from Eq. 1, several other equations establish a formulation for the scaled flow management method. These equations broadly include, but are not limited to, a calculation determining the number of management boundaries for the method, a set of management boundary limit values, a set of flow factors, and a consumption flow value.

Establish the Number of Management Boundaries (MB)

Management boundaries are defined as a predetermined number of volume limit values based upon the number of consumers in the common distribution network for the purpose of defining a flow volume level for any given consumer member to maintain a total flow equalization in a distribution network.

For a given collection of consumer members, a practical minimum number of boundaries within a distribution network is established, the full power limit being one of the boundaries.

The following equation establishes a minimum number of boundaries.

$$MB = \text{Floor}\left(\frac{n}{2}\right) \text{ where } n > 3 \qquad \text{Eq. 2}$$

It is noted that the term Floor( ) in equation 2 is a function called the "greatest integer function" and provides the greatest integer less than or equal to the value in the parentheticals. For example, given n=3, being a special case, then Eq. 2 would have a value of 1. Therefore, adding a full consumption value with the calculated value on MB, the total number of boundaries would be two, as a minimum.

For another example, given n=6, then Eq. 2 would have a value of 3. Which means, two boundary levels in addition to the third boundary representing the full consumption value.

Establish Flow Factor (FlowFact)

A flow factor is a ratio between the consumption level value (CLV) to the total consumption value for the consumer, typically set at 100%, for the purpose of maintaining a desired or mandated consumption flow volume by each consumer member.

The consumption level value (CLV) is based on the nominal controllability levels of the consumption output amount. The consumption level value is a deterministic value based on the consumer's controllability of the consumption output amount. The number of flow factor values is based on the number of management boundaries. For example, if three management boundaries are determined in Eq. 2, then three flow factors will be defined. Alternatively, if five management boundaries are determined in Eq. 2, then five flow factors will be defined. The selection of CLV values directly affects the maximum flow input limit as-implemented in the methods described herein.

The flow factor value is based on the following equation.

$$FlowFact = \frac{\text{Consumption Limit value }(CLV)}{\text{Total Consumption Value}} \qquad \text{(Eq. 3)}$$

For example, given n=6 and MB=3, a system required three flow settings. CLV_1=100%, CLV_2=75% and CLV_3=50% and the total Consumption Value is 100%. Such that:

$$FlowFact1 = \frac{100\%}{100\%} = 1.0 \qquad \text{Eq. 3a}$$

$$FlowFact2 = \frac{75\%}{100\%} = .75 \qquad \text{Eq. 3b}$$

$$FlowFact3 = \frac{50\%}{100\%} = .50 \qquad \text{Eq. 3c}$$

The flow factors regulate the maximum flow volumes for any consumer member, where the desired consumption amount of each consumer member may be less than the flow factor set limit.

Typically, the flow factors range from about 0.05 to 1, corresponding to a consumption limit value of about 5% to 100%. In some embodiments, the flow factors are chosen to be distributed equally or unequally across a defined range with "1" being the upper limit included as a flow factor. In some embodiments, the range is from about 0.05 to 1, or about 0.1 to 1, or about 0.15 to 1, or about 0.2 to 1, or about 0.25 to 1, or about 0.3 to 1, or about 0.35 to 1, or about 0.4 to 1, or about 0.45 to 1, or about 0.5 to 1, or about 0.55 to 1, or about 0.6 to 1, or about 0.65 to 1, or about 0.7 to 1, or about 0.75 to 1, or about 0.8 to 1, or about 0.85 to 1, or about 0.9 to 1, or about 0.95 to 1. In some embodiments, the range is from about 0.25 to 1. In some embodiments, the range is from about 0.5 to 1. In some embodiments, the exact flow factors implemented within the range are selected based upon optimization. In some embodiments, the exact flow factors implemented within the range are selected to be as equally distributed within the range as possible. In further embodiments, the exact flow factors implemented within the range are further optimized in consideration of a maximum flow value (MFV).

The maximum flow volume is governed by Eq 1. The top two FlowFact values are part of the following relationship determining the maximum flow volume (MFV). While the MFV is not a value required by the methods and systems herein, it is a useful relationship for determining an appropriate total maximum flow volume into the common distribution network. The MFV may be calculated according to Eq. 4:

MFV=(n−1)FlowFact(second highest value)+Flow-Fact(highest value)     Eq. 4

For example, given n=6 and MB=3, FlowFact1=1.0 and FlowFact2=0.75. Such that:

MFV=(6−1)*(0.75)+1.0=4.75

Establish Management Boundaries Limits (MBL)

Given a number of management boundaries (MB) from Eq. 2, an equivalent set of management boundary limits (MBL) need to be established. For example, if three management boundaries are determined in Eq. 2, then three management boundary limits will be defined. Alternatively, if five management boundaries are determined in Eq. 2, then five management boundary limits will be defined. A Management boundary limit (MBL) is a value establishing a consumption level, for each member, in which a transition will occur between flow volume settings.

The following are constraints for establishing MBLs:
a) The $n^{th}$ consumer will not need active flow management below full consumption amount.

Rationale: The $n^{th}$ consumer is the last member of the network and will not limit the flow volume below maximum capacity.

b) No more than (n−1) consumers shall limit their flow volume below a predetermined minimum amount.

Rationale: Input system capacity is too small if more than (n−1) consumer amounts are needed to manage every consumer's consumption.

A) Determine the Lower Management Boundaries Limit

Equation 5 is derived from Eq. 3 and substituting the minimum required flow volume for all consumer members, from the right-hand side of Eq. 1, into the denominator thus determines the lower boundary limit. This limit value is the minimum amount of flow (n−1) consumer members based on the use of the lowest flow factor value (Example: FlowFactor3 Eq. 3c) with the last consumer equal to 100% flow consumption.

The lower management boundaries limit is based on Eq. 2, which infers the following conditions:

1) C(n) equals the full load of the $n^{th}$ consumer,
2) All other consumers are set to the lowest flow volume setting $$\text{MBL\_}(MB) = \frac{CLV}{CLV + (n-1)*FlowFact(\text{Lowest value})*CLV} \quad \text{Eq. 5}$$

Which simplifies to:

$$\text{MBL\_}(MB) = \frac{1}{1 + (n-1)*FlowFact(\text{Lowest value})} \quad \text{Eq. 6}$$

Equation 6 infers that the maximum flow volume amount of any device within the network is independent of managing the maximum input flow volume for all consumers connected on a common distribution network.

For example, given n=6, MB=3, CLV=50% and FlowFact3 (Eq 3c)=0.50:

$$\text{MBL\_3} = \frac{1}{1 + (6-1)*0.50} = 0.286$$

B) Determine the Next Limit Factor

The next limit is based on the next larger value of Flow factor (Example FlowFactor2: Eq. 3b) load values following this relationship:

$$\text{MBL\_}(MB-1) = \frac{(\text{Total Consumption Value}*(n)*FlowFact) - \text{Total Consumption Value}}{(n-1)*\text{Total Consumption Value}} \quad \text{Eq. 7}$$

Which simplifies to:

$$MBL(MB-1) = \frac{(n*FlowFact(\text{next larger value}) - 1)}{(n-1)} \quad \text{Eq. 8}$$

For example, given n=6, MB=3, CLV=50% and FlowFact2=0.75:

$$\text{MBL\_2} = \frac{(6*0.75) - 1}{(6-1)} = 0.70$$

The last management boundary limit, MBL_1, will have a numerical value of 1.0. This represents the total flow volume consumption (demand) from all consumers is below the maximum consumption volume limit. The management boundaries limit (MBL) data will be externally generated and hosted as a data set into the control processor unit within the consumer member device.

Consumer Flow Value (CFV)

The consumer flow value is based on a ratio of the Total Consumption Value (100%) to the input flow volume value, provided as a measured quantity from an input flow detector, following this relationship:

$$\text{Consumer flow value}(CFV) = \frac{\text{Total Consumption Value}}{\text{input flow volume measurement}} \quad \text{Eq. 9}$$

For example, if the input flow to one member (consumer) is 150%, which represents a cumulative flow value of the consumer output itself and the contribution of the remaining downstream consumers, the CFV would be:

$$CFV = \frac{\text{Total Consumption Value}}{\text{input flow volume measurement}} = \frac{100\%}{150\%} = 0.66$$

The calculated value of consumer flow is used to compare it to the values provided from the management boundaries limit (MBL) values to determine whether a new flow factor is to be set for the consumer.

Set Flow Factor Value

When a consumer flow value exceeds one of the management boundaries limits, a new flow factor value will be communicated to the flow volume regulator. When a consumer CFV value is smallest then a MBL value, the corresponding FlowFact value for the smallest MBL value greater than the CFV is communicated to the flow regulator of that corresponding consumer to regulate the consumption of flow capacity. When the CFV is larger than the largest MBL (typically, when the CFV is larger than 1), then the communicated flow factor would correspond to the largest MBL (typically flow factor of 1, representing unregulated flow). This is because a consumer having a CFL larger than one is receiving less media than its total consumption value and would therefore not need to be regulated. It can be appreciated that the phrase "smallest MBL not exceeded by the CFV" does not aim to exclude the situation where the CFV is larger than the largest MBL—if there is not a "smallest MBL not exceeded by the MBL", then the flow factor (typically 1.0) associated with the largest MBL (typically 1.0) is communicated to the flow regulator of the consumer.

For example, given the following information for n=6 and MB=3:

$FlowFact1 = 1$ $FlowFact2 = 0.75$ $FlowFact3 = 0.5$ $MBL\_1 = 1$

MBL_2 = 0.7

MBL_3 = 0.286

For example, with a CFV of 0.66, being a lower value than MBL_2 value of 0.7, the Set Flow factor value is set to Flow Fact2 value and communicated to the flow volume regulator of the consumer.

Referencing FIG. 1, the scaled flow management method 300 manages a prescribed quantity of flow volume, among three or more consumer members having the same maximum consumption volume limit, or total consumption value (referred to herein as "identical consumer members"), connected on a common distribution network. The scaled flow management method 300, as applied to each consumer, receives one input measurement, input flow volume measurement 110, and has one output named flow factor value 330 output to the flow regulator of the consumer.

Figure 2:
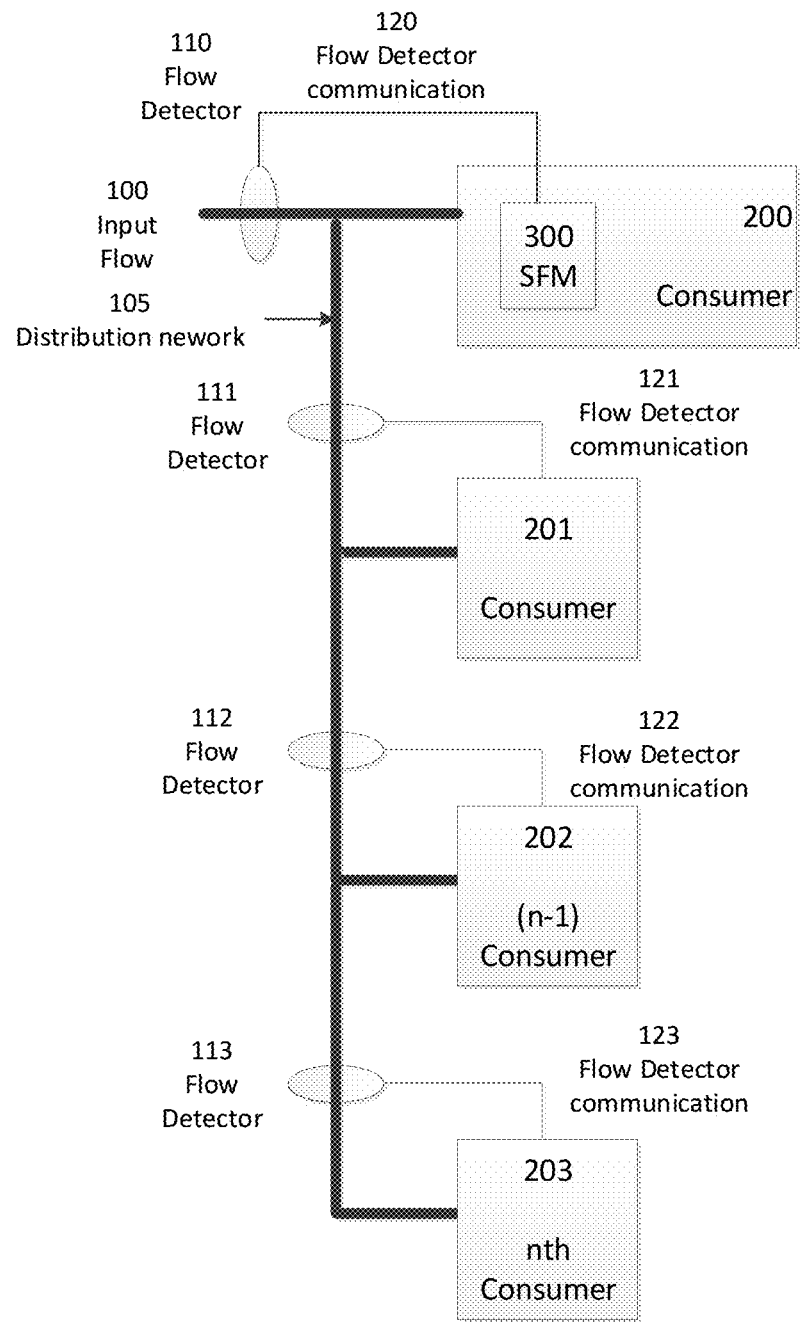
FIG. 2 depicts the Scaled Flow management method applied to a parallel distribution network.

Referencing FIG. 2, the input flow volume measurement 110 is a quantitative measurement of flow, such as a fluid flow rate in gallons per minute or electrical current flow rate in amperes. Consumers 200 are aligned along the distribution network 105 in parallel. The distribution network transports a media, which may be a fluid, electrical current, data or any other transportable medium. There is a flow detector 110-113 associated with each consumer 200-203 which measures the flow to the associated consumer and downstream consumers. In alternative embodiments, the flow detector may be external to the consumer package. Each flow detector communicates 120-123 with the scaled flow management system to generate a consumer flow value for each consumer (310 in FIG. 1).

Figure 3:
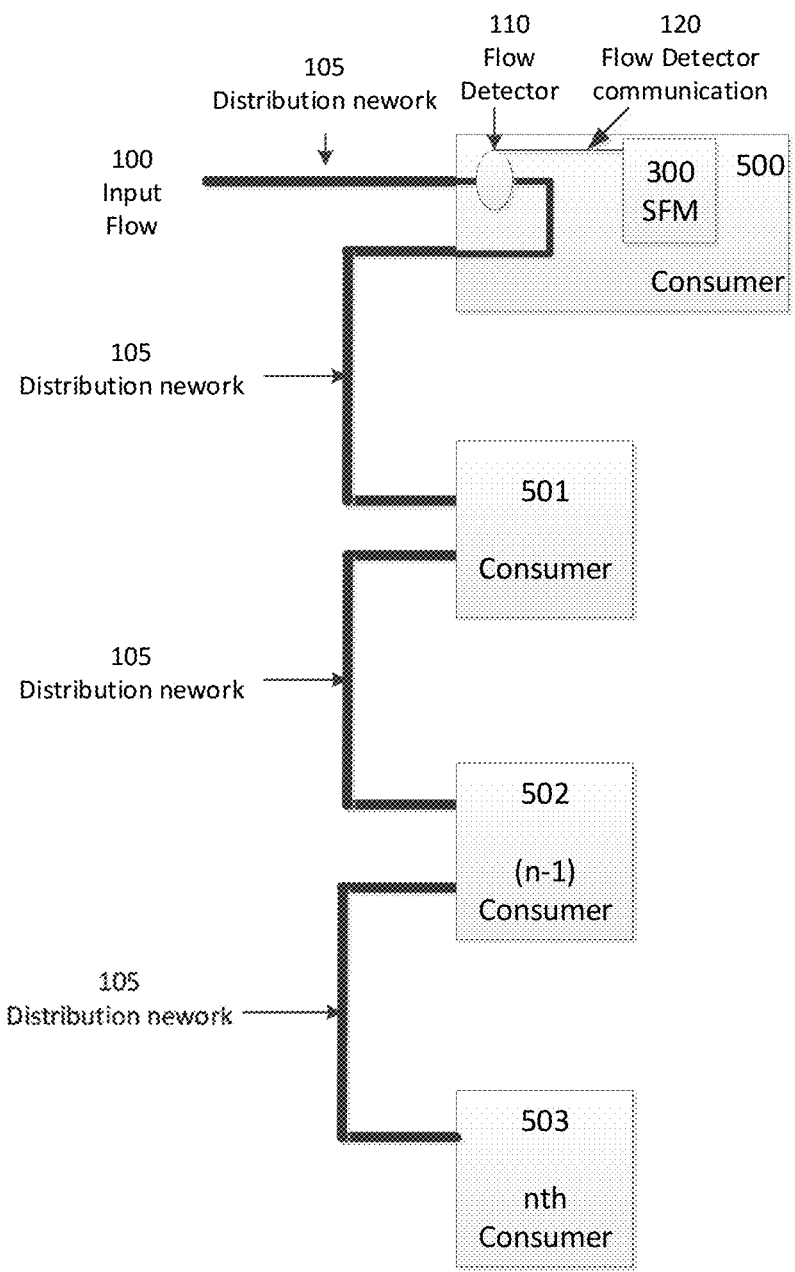
FIG. 3 depicts the Scaled Flow management method applied to a series distribution network.

Referencing FIG. 3, the input flow volume measurement 110 is a qualitative measurement of flow, such as a fluid flow rate in gallons per minute, electrical current flow rate in amperes or watts or data rate in bits per second. Consumers 500 are aligned along the distribution network 105 in series. The distribution network transports a media, which may be a fluid, electrical current, data or any other transportable medium. There is an internal flow detector 110 in each associated consumer 500-503 which measures the flow to the associated consumer and downstream consumers. In some embodiments, each consumer has a flow detector which communicates 120 internal to each consumer 500-503. In alternative embodiments, the flow detector may be external to the consumer package. Each flow detector communicates 120 with each scaled flow management system (300) to generate a consumer flow value for each consumer (310 in FIG. 1).

Figure 4:
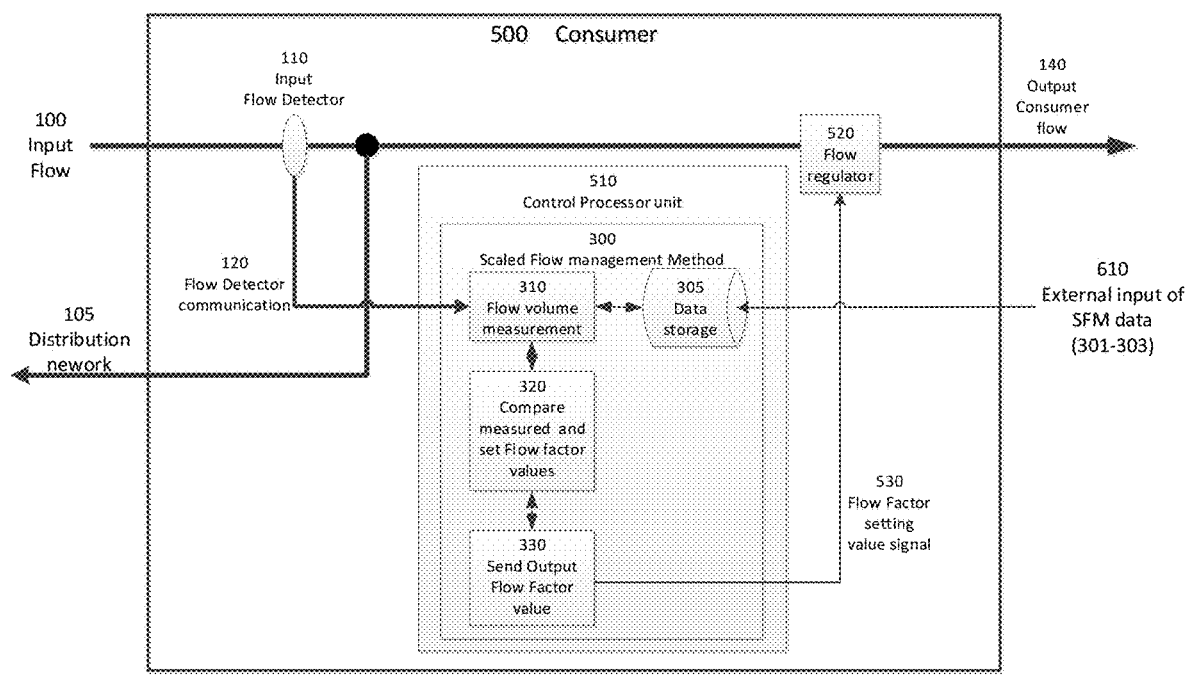
FIG. 4 depicts the Scaled Flow management method illustration.

FIG. 4 illustrates the scaled flow management for an individual consumer 500 aligned along the distribution network 105 in series. The input flow 100 is measured 110 and a flow volume measurement 310 is communicated to a scaled flow management system 300 contained within a control processor unit 510. The input flow 100 is measured 110 is as a qualitative measurement of flow, such as a fluid flow rate in gallons per minute or electrical current flow rate in amperes. The flow volume measurement (i.e. the CFV) is compared to the MBL associated with the set flow factor value 320 and an output flow factor value 330 is set based upon the comparison as described in the foregoing. The flow factor set value is signaled 530 to flow regulator 520 which thereby provides output consumer flow 140. The Scaled flow management (SFM) data (301-303) will be externally transmitted 610 and hosted into the consumer member device data storage 305. The SFM data may comprise a set of flow factors and their corresponding set of MBLs.

The calculated consumer flow value 310 is a mathematical ratio of the Total Consumption Value stored in data storage 305 to the input flow volume measurement 110 values. The sampling duty cycle of the calculated consumer flow value (CFV) 310 will be dependent on the overall flow rate of change for the system. For example, in the case of a fluid flow the rate of change can be measured in several hours, and therefore the sampling time can be measured once an hour. In another example, in the case of electricity flow, the rate of change can be on the order of milliseconds or potentially longer. In alternative embodiments, the sampling duty cycle of the CFV may be according to a fixed time interval, such as every about 100 ms, about 500 ms, about 1 s, about 5 s, about 10 s, about 20 s, about 30 s, about 40 s, about 50 s, about 1 minute, about 5 minutes, about 10 minutes, about 30 minutes, about 1 hour, about 10 hours, or about 1 day. It can be appreciated that a fixed time interval sampling duty cycle would be chosen according to the rate of change in media flow and may be dependent on the media. In an alternative embodiment, in the case of AC electricity flow, the duty cycle can be based upon a multiple or division of the AC frequency.

The management boundaries (MB) 301 are described by a mathematical equation (Eq. 2) based on a total number of consumers to establish the value of flow factors (Eq. 3) to be stored in data storage 305. The flow factor 302 (Eq. 3) are m number of mathematical equations based on the ratio of consumption level value to the total consumption value, which is typically 100%. The value of m is based on the value of management boundaries (Eq. 2). The consumption level value (CLV) is a deterministic value based on the controllability of the consumption output amount. In an exemplary embodiment, a consumption output may have prescribed controllability outputs of three levels, the number of levels being based on the value of management boundaries (MB), such as, CLV_1=100%, CLV_2=75% and CLV_3=25%.

The management boundary limits (MBLs) (Eq. 6 and Eq. 7) are m number of mathematical equations, where each equation is based on a flow factor (Eq. 3) value to be stored in data storage 305. The value of m is based on the value of management boundaries (MBs). The lowest numerical management boundaries limit value is based on the smallest numerical flow factor (Eq. 3) value in equation 10, where n is the number of consumers on a common distribution network:

$$\text{MLB\_}(MB) = \frac{1}{1 + (n-1)*\text{Lowest value } FlowFact(Eq.3c)} \quad \text{Eq. 10}$$

Therefore, each unique management boundary limit (MBL) (Eq. 6) will correspond to a lowest flow factor from Eq. 3 values.

The next higher management boundary limit (Eq. 8) corresponds to a mathematical expression not to exceed MB−1 equations based on the next larger numerical flow factor (Eq. 3) value to be inserted into Eq. 10, where n is the number of consumers on a common distribution network. In cases where there are more than one flow factors in-between the highest and lowest flow factors (i.e. MB≥4), then multiple MBL_(MB−1) values would be calculated, each using a different flow factor value.

$$\mathrm{MBL\_}(MB-1) = \frac{(n * FlowFact(\text{next larger value}) - 1}{(n-1)} \qquad \text{Eq. 9}$$

The last management boundary limit will be 1.0. This represents the full flow consumption for any consumer.

The output of the set flow factor value 320 is determined by a comparison between each management boundary limit in data storage 305 and the calculated consumer flow value 310. The output of set flow factor value 320 will be a unique flow factor (Eq. 3) value corresponding to the management boundary limit in data storage 305 that is the next larger numerical value of the calculated consumer flow value 310.

When a consumer CFV value is smallest then a MBL value, the corresponding FlowFact value for the smallest MBL value greater than the CFV is communicated to the flow regulator of that corresponding consumer to regulate the consumption of flow capacity.

The send flow factor 330 is the equivalent flow factor (Eq. 3) value by which the flow regulator 520 responds accordingly. The communication medium 530 can be analog, digital or wireless.

An alternatives electrical current measurement 110 of amperes is with the electrical power measurement of watts, which would require the addition measurement of voltage from within the consumer 500.

Exemplary System Applications

1) In one application, the flow regulator 520 may represent an internal USB power delivery controller. A USB controller contains numerous power profiles(setting) to negotiate proper power setting for the connected Portable Electronic Device. The Flow factor value signal 530 is transmit over a communication protocol, such as I²C (inter-integrated circuit protocol), SPI (serial peripheral interface), LIN (local interconnect network) or equivalent media. For example, the signal 530 instructs the USB controller 520 to offer a lower power profile when the Flow fact 330 is less than 1.0. Also, when the Flow factor 330 is less than 1.0, the USB controller 520 may offer a higher power profile to the PED (personal electronic device) device.
2) In another application, the Flow regulator 520 may represent an external USB (universal serial bus) power delivery controller, whereas the Flow factor value signal 530 is transmit over a communication protocol, such as CAN (controller area network), LIN (local interconnect network), RS485 or equivalent media.
3) In another application, the Flow regulator 520 may represent an external USB power delivery controller connected to more than one Portable Electronic Device.
4) In another application, where multiple consumers, for instants 500-503, may be incorporate into a single device providing a Flow factor value signal 530 to one or more internal regulators.

4 may apply to electric systems or fluid flow systems, are commonly applied within industry.

5) In another application, where multiple consumers, for instants 500-503, may be incorporate into a single device providing a Flow factor value signal 530 to one or more external regulators.

5 may cascade into multiple layers throughout a network.

6) In another application, the data within the data storage 305, specifically values derived from Eq. 3 and Eq 4 from the external input of SFM data 610, may be mathematically manipulated to optimize CLV values. This is would be accomplished by first setting the MVF value and solving for new FlowFact and CLV values.
7) In another application, the SFM 300, specifically Eq. 1-6, may be mathematically manipulated to product CLV, FlowFact and LimitFactor values for non-identical consumer members connected on a common distribution network. This is would be accomplished by expanding the summation term "B" from equation one to represent the individual consumer and its own CLV, FlowFact and LimitFactor values.
8) In another application, use the flow regulator 520 to control bandwidth on a communication network.
9) In another application, a single consumer 500 and its flow regulator 520 may contain a timer(scheduler) to only allow full-flow (power charging as an example) during certain times of the day. As an example, only allowing PED or vehicle charging during off-peak hours.
10) Based on #9—The consumers may be energy sources in a renewable energy network (micro-grid). SFM 300 may be used to limit the output energy to avoid overload the transmission line capability. In turn, the flow regulator 520 may be used to divert excess energy production to an energy storage device(s), such as batteries or hydrogen storage.

What is claimed is:

1. A method to manage flow capacity, so as to not exceed a maximum input flow volume in a common distribution network, comprising:
   providing a system in communication with the common distribution network, the system comprising a plurality of consumers within the distribution network, each individual consumer comprising an input flow detector, a central processing unit, a data storage unit, and a flow regulator, wherein each individual consumer includes a total consumption value of 100%;
   calculating a set of management boundary limits (MBLs) based on a set of flow factors, wherein the MBLs are not-to-exceed values of flow capacity for each of the consumers and wherein the flow factors are predetermined percentages of the total consumption value;
   loading the MBLs and associated flow factors into the data storage units of each individual consumer;
   measuring an input flow volume to each individual consumer through the input flow detector to determine a consumer flow value (CFV) for each individual consumer, wherein the CFV is a ratio of the total consumption value to the input flow volume to that corresponding individual consumer;
   comparing the CFV to the MBL in the central processing unit of each individual consumer such that the central processing unit selects a single flow factor from the set of flow factors; and
   communicating the single flow factor selected by the central processing unit to the flow regulator to regulate the consumption of flow capacity by each individual consumer.
2. The method of claim 1, wherein the central processing unit of each consumer compares the CFV to the MBL to i) identify the smallest MBL value not exceeded by the CFV or ii) identify that the CFV exceeds all MBLs; and
   communicating either of
      i) the flow factor corresponding to the smallest MBL not exceeded by the CFV, or
      ii) the flow factor corresponding to the largest MBL if the CFV exceeds all MBLs, from the central processing unit of each of the plurality of consumers to the flow regulator of that corresponding consumer.

3. The method of claim 1 wherein the sets of MBLs and flow factors are identical for each of the plurality of consumers.

4. The method of claim 1 wherein the plurality of consumers are aligned on the common distribution network in series.

5. The method of claim 1 wherein the plurality of consumers are aligned on the common distribution network in parallel.

6. The method of claim 1, wherein the CFV is determined at a frequency according to a sampling duty cycle of the input flow detector.

7. The method of claim 1 wherein the distribution network distributes one or more of fluids, electricity, and data.

8. The method of claim 1 wherein each of the MBLs and corresponding flow factors are distributed in the range from about 0.05 to 1.

9. The method of claim 1 wherein the consumers are not linked in communication and wherein the flow capacity of the common distribution network is managed without an external command or master controller.

10. A system for managing flow capacity, so as to not to exceed a maximum input flow volume in a common distribution network, comprising:
  (a) a plurality of individual consumers within the distribution network, each individual consumer comprising:
  (i) a data storage unit containing a set of flow factors and a set of management boundary limits (MBLs) calculated from the set of flow factors, wherein the MBLs are not-to-exceed values for each of the consumers, wherein the flow factors are predetermined percentages of the total consumption value of 100%;
  (ii) an input flow detector for measuring an input flow volume of each individual consumer and any downstream consumers to determine a consumer flow value (CFV), wherein the CFV is a ratio of a total consumption value to the input flow volume of that corresponding individual consumer; and
  (iii) a central processing unit programmed to compare the CFV to one or more of the MBLs to determine a flow volume limit for the consumer,
  (b) a flow regulator associated with each individual consumer for regulating consumption of each individual consumer, wherein the flow regulator is internal or external to each individual consumer; and
  (c) an input flow source of the media.

11. The system of claim 10 wherein the flow regulator is internal to the consumer.

12. The system of claim 10 wherein the flow regulator is external to the consumer.

13. The system of claim 10, wherein the consumers are linked only by the distribution network and are not further linked in communication.

14. The system of claim 10, wherein the input flow detector signal is not communicated outside of each consumer and wherein the system does not include a master controller.

15. The system of claim 10, wherein the central processing unit and flow regulator of each consumer communicate over a communication protocol selected from the group consisting of CAN (Controller Area Network), LIN (Local Interconnect Network), and RS485 (Recommended Standard #485).

* * * * *